United States Patent
Herington

(10) Patent No.: US 8,966,474 B2
(45) Date of Patent: Feb. 24, 2015

(54) MANAGING VIRTUAL MACHINES USING SHARED IMAGE

(75) Inventor: Dan Herington, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1693 days.

(21) Appl. No.: 11/742,536

(22) Filed: Apr. 30, 2007

(65) Prior Publication Data

US 2008/0271017 A1   Oct. 30, 2008

(51) Int. Cl.
*G06F 9/455* (2006.01)

(52) U.S. Cl.
CPC .. *G06F 9/45558* (2013.01); *G06F 2009/45579* (2013.01)
USPC .......................................................... 718/1

(58) Field of Classification Search
None
See application file for complete search history.

(56) References Cited

U.S. PATENT DOCUMENTS

| | | | |
|---|---|---|---|
| 6,075,938 A * | 6/2000 | Bugnion et al. ................. 703/27 |
| 7,577,722 B1 * | 8/2009 | Khandekar et al. ........... 709/220 |
| 2002/0147862 A1 | 10/2002 | Traut et al. |
| 2002/0194482 A1 | 12/2002 | Griffin et al. |
| 2005/0210461 A1 * | 9/2005 | Srivastava et al. ............ 717/170 |
| 2005/0268298 A1 | 12/2005 | Hunt et al. |
| 2006/0184937 A1 * | 8/2006 | Abels et al. ....................... 718/1 |
| 2006/0230216 A1 | 10/2006 | Fuente |
| 2006/0288168 A1 | 12/2006 | Stevenson |

OTHER PUBLICATIONS

Internet Suspend/Resume Kozuch et al IEEE, Jun. 2002.*

* cited by examiner

*Primary Examiner* — Mengyao Zhe
(74) *Attorney, Agent, or Firm* — Koester Bertani LLP

(57) ABSTRACT

A method for managing a computing system comprises identifying read-only portions of a file system, sharing the read-only portions of the file system among a plurality of virtual machines, and managing the shared read-only portions of the file system as a single unit.

12 Claims, 11 Drawing Sheets

MANAGING VIRTUAL MACHINES USING SHARED IMAGE

BACKGROUND

A virtual machine is a software construct that creates a virtualized environment between a computing system such as a server and an operating system, enabling software operation on an abstract or virtual machine.

One problem with virtual machines is that a server running multiple virtual machines has multiple operating systems. A substantial portion of the total cost of ownership (TCO) of a server is spent in ongoing maintenance and management of the operating systems.

Management of multiple operating systems is typically assisted by tools that simplify administration of servers or groups of servers and the operating systems executing in the servers. Such tools enable synchronization of files and logs as well as command fan-out capabilities. Other tools enable a user to maintain a large number of servers from a central location.

SUMMARY

An embodiment of a method for managing a computing system comprises identifying read-only portions of a file system, sharing the read-only portions of the file system among a plurality of virtual machines, and managing the shared read-only portions of the file system as a single unit.

BRIEF DESCRIPTION OF THE DRAWINGS

Embodiments of the invention relating to both structure and method of operation may best be understood by referring to the following description and accompanying drawings.

DETAILED DESCRIPTION

An illustrative system and method for simplify management of Virtual Machines (VMs) using shared disk images.

Consolidation of operating systems for multiple virtual machines enables a significant opportunity for savings in the cost of operating a server.

Benefits of consolidation through creation of a virtualized environment include lower system acquisition costs, increased utilization of servers, and fewer servers to handle a given number of workloads. Management costs are reduced since the number of systems and operating system images to manage is smaller.

For production workloads, consolidation is facilitated or enabled by isolation between workloads, which includes resource, fault, and security isolation.

Physical partitions, virtual partitions, and virtual machines are useful for supplying isolation but can result in proliferation of operating system images and an associated increase in management cost since a separate OS image is associated with each workload. Such isolation has advantages since the operating system can be tuned for the application, but also has drawbacks because management overhead is not reduced despite the consolidation. Management costs are also increased because separate copies of the application still exist so that applications are managed as though in separate systems. Furthermore, backups are slightly more complex for systems with virtual machines since a platform manager as well as the individual virtual machines is to be managed.

Virtual Machines enable execution of multiple operating system images on a single set of hardware with a high granularity of resource sharing, possibly resulting in a large number of operating system images and imposing significant burden for managing the images. Structures and techniques are shown herein for sharing of disk images which can significantly simplify ongoing management of the virtual machines by enabling groups of virtual machines to be installed, patched, and backed up concurrently.

System consolidation can be attained by using virtual machines which can virtualize all the resources of the system including the disks and file systems. Accordingly, virtual machines can be used to create a small set of operating system images on read-only file systems and patching the images appropriately for each application, thus making available multiple operating system images which are tuned for each application. The multiple operating system images can be used for rolling upgrades and testing, then for back up in a single operation for all virtual machines using the operating system images. The same procedure can be performed for each application.

Figure 1A:
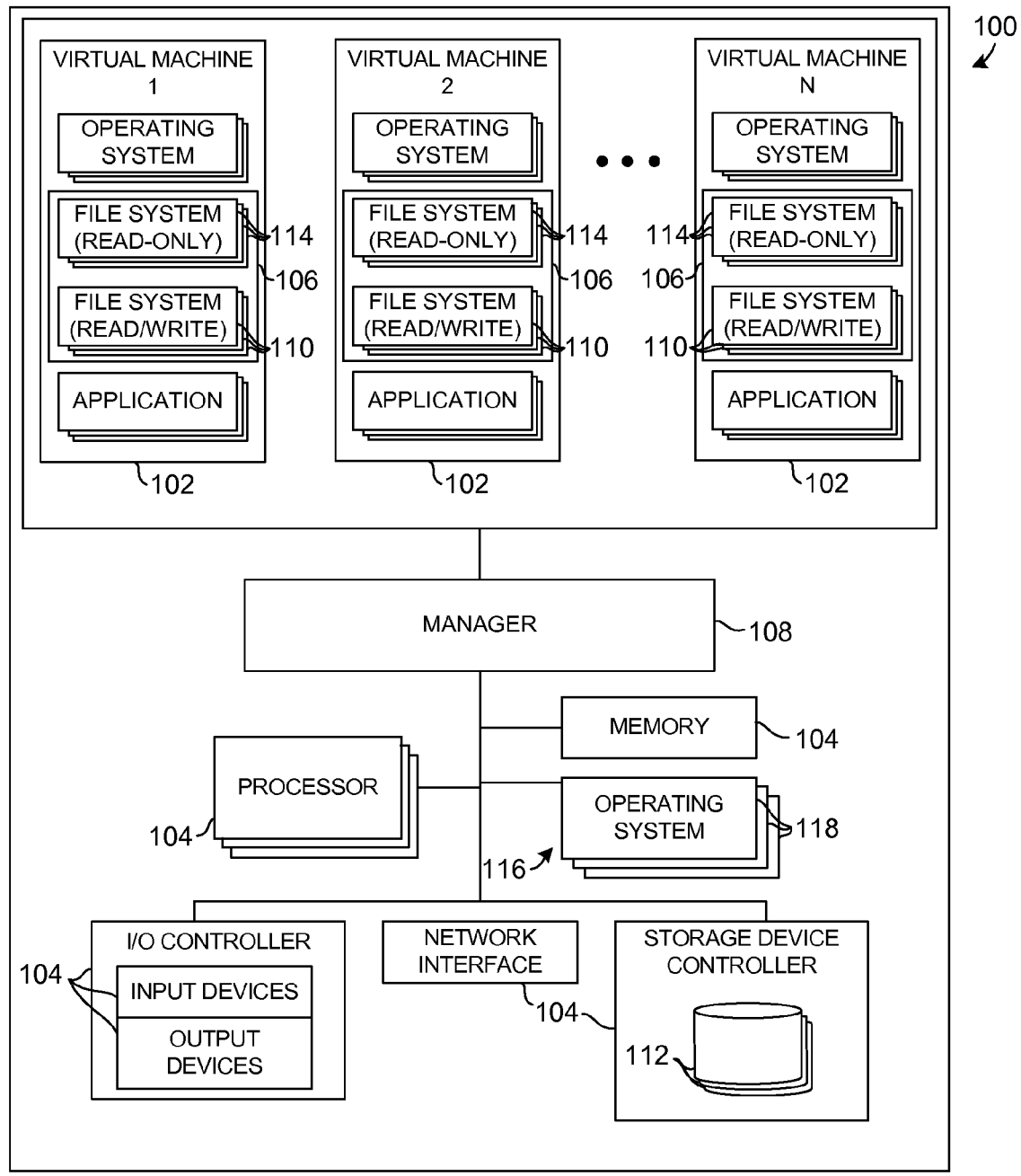
FIG. 1A is a schematic block diagram depicting an embodiment of a computing system adapted for managing virtual machines using shared images.

Referring to FIG. 1A, a schematic block diagram depicts an embodiment of a computing system 100 adapted for managing virtual machines 102 using shared images. The illustrative computing system 100 comprises multiple resources 104 and multiple virtual machines 102 that can access the resources 104. The computing system 100 further comprises a file system 106 that can be stored on the resources 104 and supplies storage for the virtual machines 102. A manager 108 can execute on host managing the virtual machines 102 and is operative to identify read-only portions 114 of the file system 106, share the read-only portions 114 of the file system 106 among the virtual machines 102, and manage the shared read-only portions 114 of the file system 106 as a single unit.

Virtual machine installation utilities can be used to define and assign shared read-only file systems to virtual machines 102. In some embodiments, shared file systems can be supported by a high availability facility. Toolkits or documents for the operating system and major independent software vendors (ISV) applications can be used to differentiate read-only files from read-write configurations and data.

The virtual machine installation utilities can be implemented to enable virtual machine rapid deployment and/or provisioning investigation with a capability to define read-only file systems and to configure shared read-only file systems when creating a virtual machine 102. The virtual machine installation utilities can facilitate operations of the operating system, for example by implementing plug-in wizards for applications.

In some embodiments, virtual machine management using the illustrative manager 108 and associated techniques can be assisted by a copy-on-write file system so that, if the same file is displayed in multiple places and the file is modified, then a copy of the file is automatically created. Thus a copy of the file is created and presented to the application or partition that changes the file so at that point forward the file is different for the modifying application or partition in comparison to all others.

The manager 108 thus enables disks and file systems 106 to be shared by groups of virtual machines 102. For example, many portions of a UNIX file system could have read-only access and can be shared by a number of virtual machines 102. By sharing the read-only portions 114 of the file system 106, multiple virtual machines 102 can be managed as a single unit.

A copy/patch management system enables creation of a copy of one or more shared file systems, and application of patches to the copy. The copy/patch management system can copy a portion or possibly the entire virtual machine. The copy/patch management system may also be used to display a list of read-only file systems as part of copy and request whether the file systems should be shared or copied.

The manager 108 can operate to assign shared read-only file systems to selected virtual machines. The manager 108 also can distinguish read-only files from read-write files and data.

The manager 108 can also organize backups so that data is backed up and restorable within each virtual machine while shared file systems are not duplicated for each virtual machine.

The manager 108 can operate as a single-system management utility for virtualized environments, for example for usage with virtual partitions and/or virtual machines.

Figure 1B:
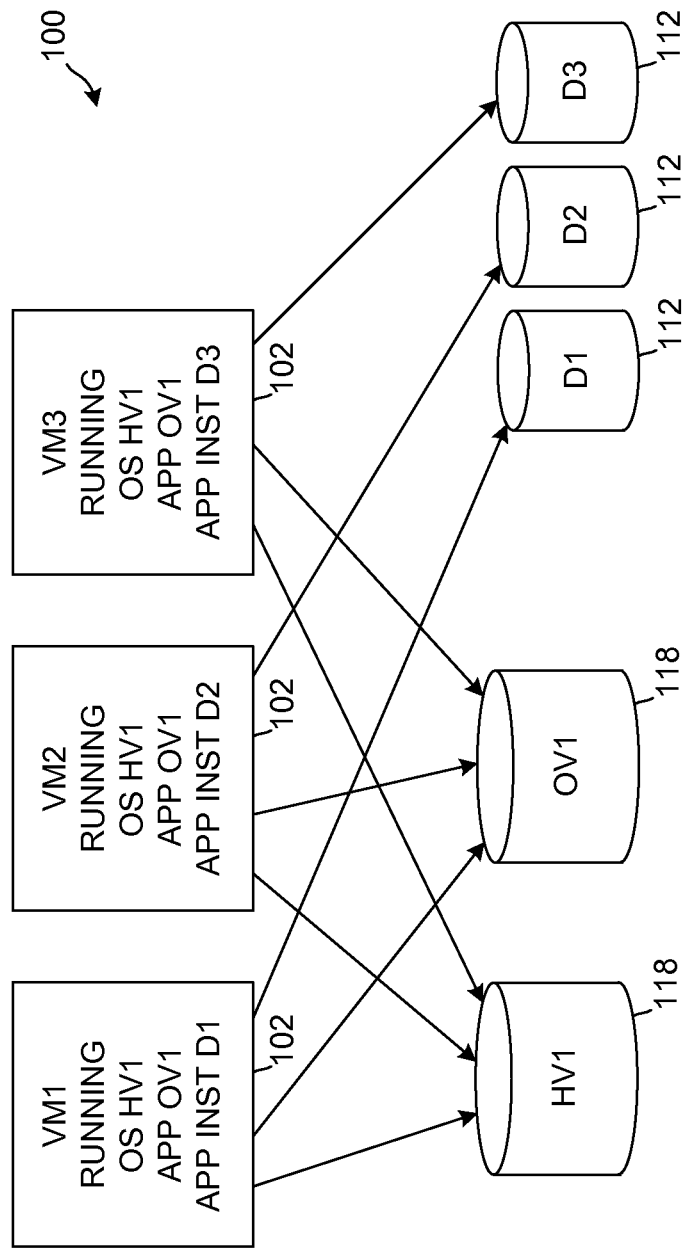
FIG. 1B is a schematic block and pictorial diagram illustrating sharing of disk images by virtual machines.

Referring to FIG. 1B, a schematic block and pictorial diagram illustrates sharing of disk images 112 by virtual machines 102. The manager 108 instantiates an operating system image 118 in an individual virtual machine with read-only portions 114 that are shared among the multiple virtual machines 102 with read-write portions 110 that are accessible to the individual virtual machine alone.

The computer system 100 shown in FIG. 1B, for purposes of example only, includes three virtual machines 102, two operating system images 118, and three disk images 112. In the illustration, the three virtual machines 102 are labeled vm1, vm2, and vm3, the two operating system images 118 include an operating system image Hv1 and an application image Ov1, and the disk images 112 are labeled d1, d2, and d3. Virtual machines vm1, vm2, and vm3 each share the operating system images Hv1 and Ov1, but have separate read/write access to disk images h1, h2, and h3, respectively.

Figure 1C:
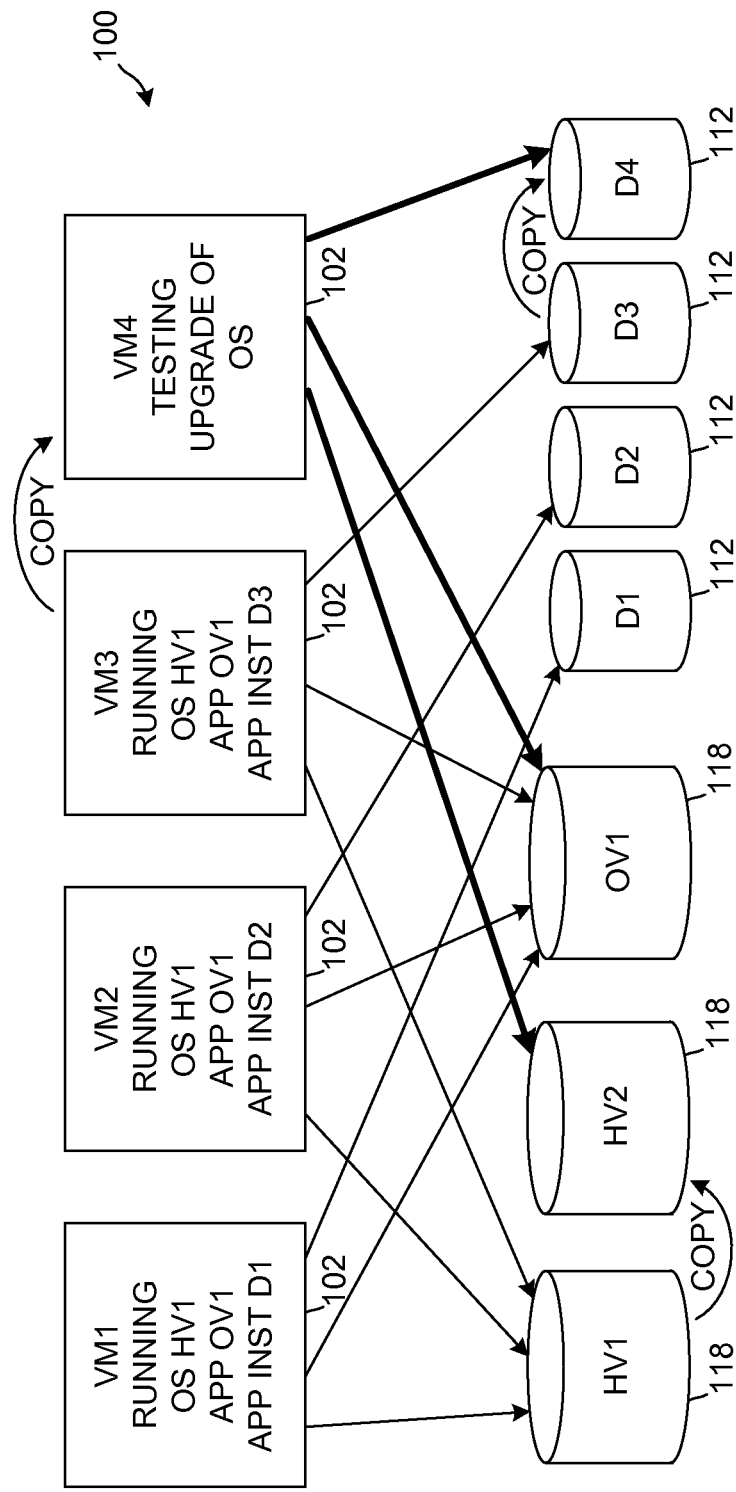
FIG. 1C is a pictorial and block diagram showing a configuration for upgrading or patching an operating system image.

The illustrative computing system 100 and manager 108 can also perform patch management functionality that simplifies management of the shared file systems 106. Referring to FIG. 1C, a pictorial and block diagram illustrates a configuration for upgrading or patching an operating system image 118. The manager 108 can create a set 116 of operating system images 118 on a combination of read-only file systems 114 and read-write file systems 110, and selectively patch the operating system image set 116 for individual applications. Selected operating system images 118 are tuned for the individual applications for usage in rolling upgrades and testing. The operating system image set 116 can be backed up for virtual machines that use the operating system image set 116.

Patch management functionality is facilitated by the illustrative computer system 100 and associated techniques by enabling a small number of operating system binary images for a large number of virtual machine, and a small number of application images for a large number of virtual machines.

Management overhead is greatly simplified by the reduced number of operating system images and application images to manage, patch, or upgrade, thereby greatly simplifying rolling upgrades.

The illustrative system and techniques enable many of the management cost benefits of consolidation on a single operating system image, but creates isolated and secure operating system images for each instance of an application.

In the illustrative example, a new virtual machine vm4 is created and copied from vm3. New operating system image Hv2 is created and copied from Hv1. New disk image d4 is created and copied from d3. New operating system image Hv2 includes upgrades or patches over Hv1. The new virtual machine vm4 has exclusive access to upgraded operating system Hv2 but shares operating system image Ov1, and has separate read/write access to disk image h4. Virtual machine vm4 can be used for testing the upgrade of the operating system.

To perform the various operations, the manager 108 can include tools for instantiating a virtual machine operating system image 118 with portions of the file system 114 as read-only and shared, and portions that are read-write and owned by the virtual machine 102. Other tools can be used that enable cloning of the shared portions for performing rolling upgrades of the shared portions of the file system.

In an example operation, the manager 108 can operate to create a copy of one or more shared file systems and display a list of read-only file systems as part of a copy. The manager 108 further can enable interactive selection of systems on the list of read-only file systems to be shared or copied, then patch the read-only file systems which are selected for sharing or copy.

Figure 1D:
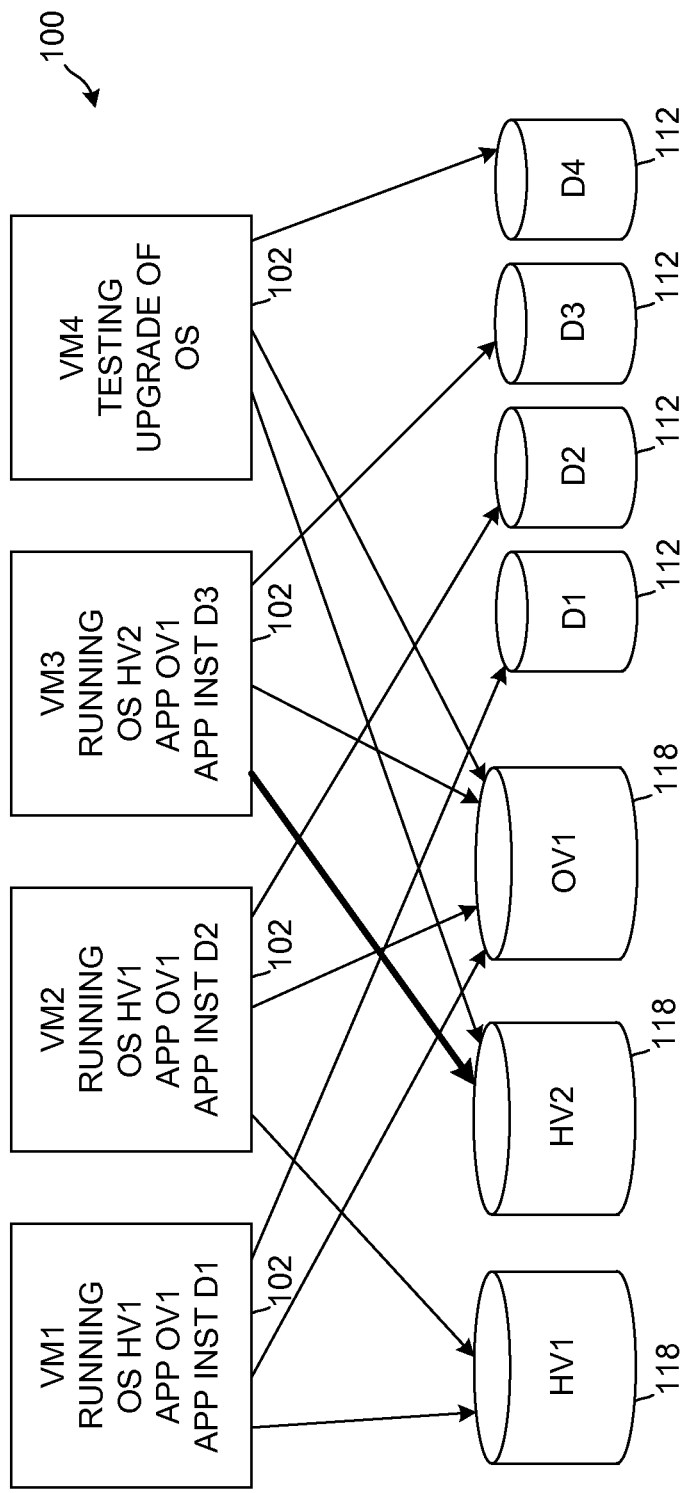
FIG. 1D is a schematic block and pictorial view showing a technique for reconfiguring virtual machines after testing.

Referring to FIG. 1D, a schematic block and pictorial view shows a technique for reconfiguring virtual machines 102 after testing. The manager 108 controls sharing of one or more disk image 112 among the multiple virtual machines 102 and creates a new virtual machine for operation among the multiple virtual machines 102. The manager 108 can also copy a selected operating system image to the new virtual machine, upgrade or patch the selected operating system image, and test the upgraded or patched operating system image. The virtual machines 102 are reconfigured to use the upgraded or patched operating system image, and then the reconfigured virtual machines 102 are rebooted.

In the illustrative example, after testing of the upgrade of the operating system, other virtual machines, specifically vm3, can be reconfigured to use Hv2, and rebooted when ready so that virtual machine relinquishes sharing of Hv1 and begins running and sharing operating system image Hv2.

Each virtual machine 102 can be configured to bootstrap load a particular copy of the operating system file systems 114, with a particular copy of the application and data file systems that is separate for each instance. A data area has the read/write file systems for the operating system and application instance configuration and data for the instance of the application.

Figure 1E:
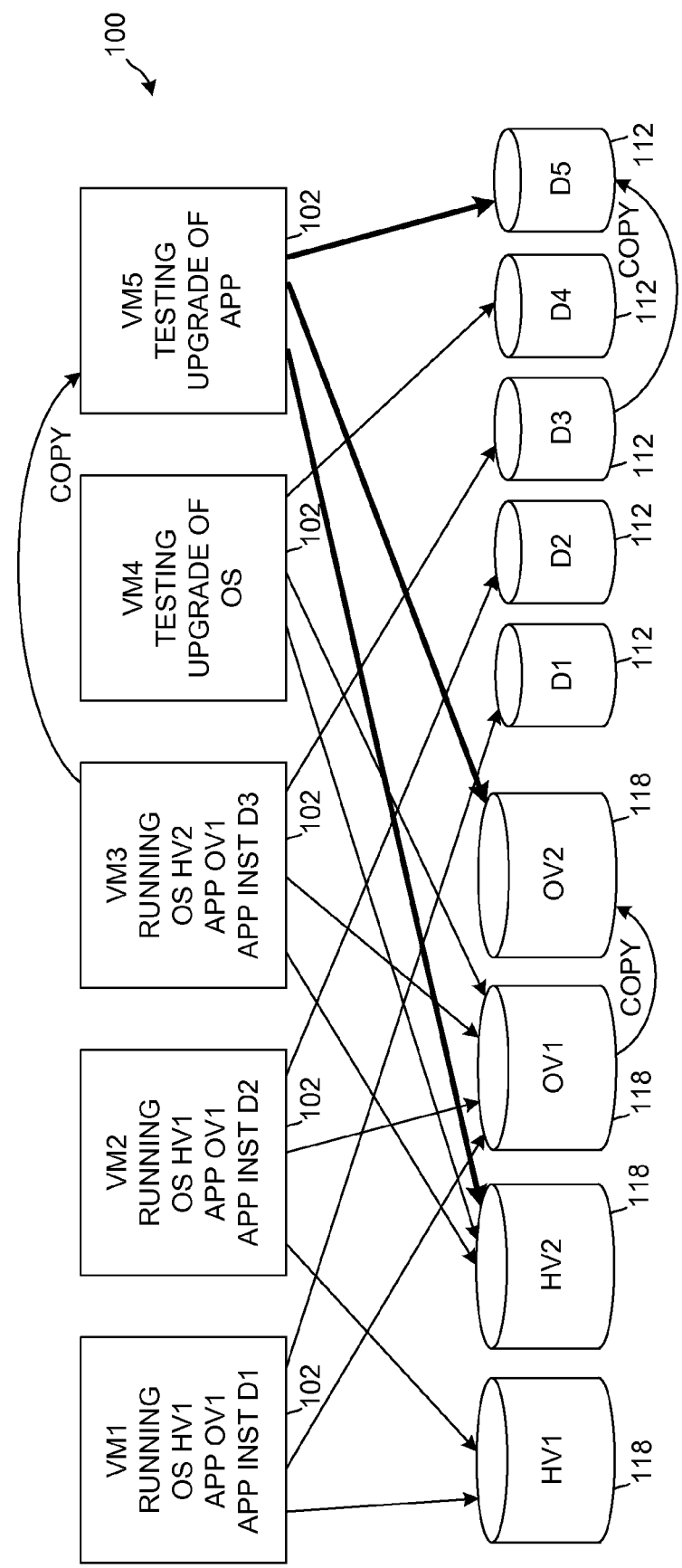
FIG. 1E is a pictorial and block diagram showing a configuration for upgrading or patching another operating system image.

Referring to FIG. 1E, a new virtual machine vm5 is created and copied from vm3. New application operating system image Ov2 is created and copied from Ov1. New disk image d5 is created and copied from d3. New operating system image Ov2 includes upgrades or patches over Ov1. The new virtual machine vm5 has exclusive access to upgraded operating system Ov2 but shares operating system image Hv2 with virtual machines vm3 and vm4, and has separate read/write access to disk image h5. Virtual machine vm5 can be used for testing the upgrade of the application.

Figure 1F:
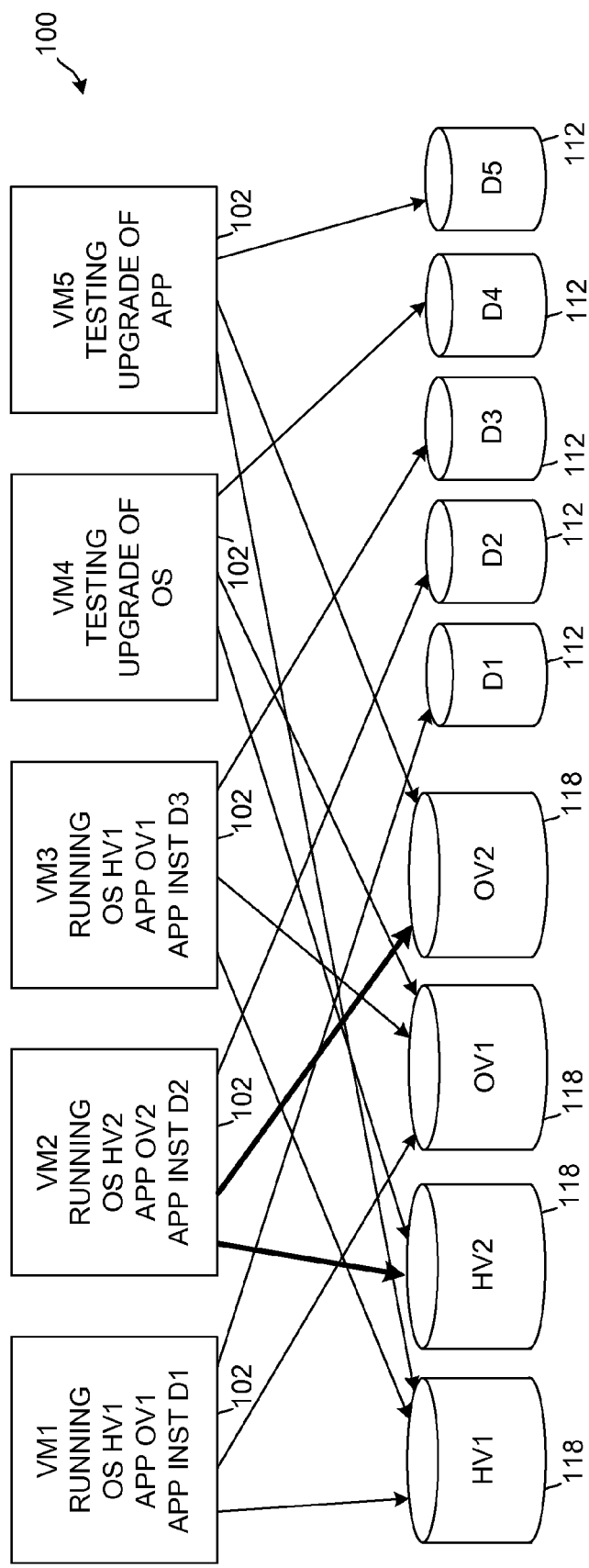
FIG. 1F is a pictorial and block diagram showing rolling upgrade of production virtual machines.

In an example implementation shown in FIG. 1F, rolling upgrade of production virtual machines 102 is shown in a block and pictorial diagram. The manager 108 clones the shared portions 114 to enable rolling updates of the shared portions 114.

For example, the manager 108 can operate to initiate sharing of one or more disk images 112 among the virtual machines 102, create a new virtual machine for operation among the multiple virtual machines 102, and copy a selected operating system image 118 to the new virtual machine. A rolling upgrade is performed using the shared disk image or images 112 and migrating a production virtual machine to the upgraded disk image or images 112. The old or legacy disk images from prior to the rolling upgrade can be selectively archived and/or removed.

In the illustrative example, after testing of the upgrade of the application, rolling upgrades of production virtual machines can be performed. For example other virtual machines, specifically vm2, can be reconfigured to share upgraded operating system images Hv2 and Ov2, and rebooted when ready so that virtual machine relinquishes sharing of Hv1 and Ov1 and begins running and sharing operating system images Hv2 and Ov2.

Figure 1G:
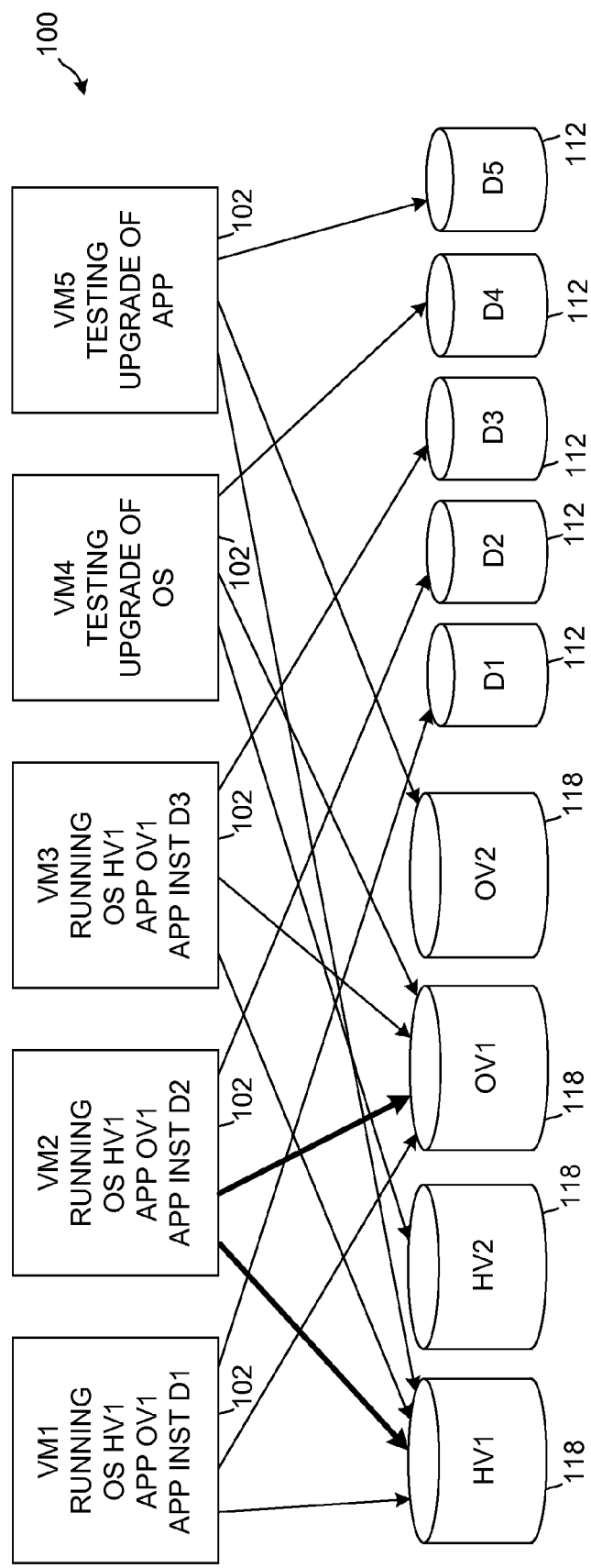
FIG. 1G, a pictorial and block diagram shows that, if an upgrade has problems, a previous configuration can be restored with a reboot.

Referring to FIG. 1G, if an upgrade has problems, a previous configuration can be restored with a reboot. As shown, virtual machine vm2 is restored to the previous configuration in which operating system images Hv1 and Ov1 are restored.

Thus referring to FIGS. 1B through 1G in combination, an example of a system for managing virtual machines is shown. In the illustrative example, three virtual machines (vm1, vm2, vm3) are created and enabled to run an instance of the application (Ov1). A virtual machine has a capability to present a file system on the host to a guest so that the file system appears to the guest to be a disk. In the operating system that runs in the virtual machine 102, the presented file system appears as any other file system. For the file system upon which the application operating system image (Ov1) is installed, what is desired is to install Ov1 only once. Thus, Ov1 is installed once on the host and is presented to all three virtual machines (vm1, vm2, vm3) so that all three run Ov1 without individual installation.

A benefit is that effectively only one installation of the application is present. If subsequent patching is warranted, the patch can be made in a single operation for all three virtual machines (vm1, vm2, vm3). A patched version of the application, for example Ov2, is automatically run in the virtual machines (vm1, vm2, vm3) at the next reboot, enabling three operating system images on a single server but not three separate installations of the application.

Thus a system with multiple virtual machines can be managed as a single server and not as separate servers. In a traditional implementation, the cost of managing the operating system is actually increased as a result of virtualization with virtual machines. The system and techniques illustrated herein enable reduced management overhead for handling virtual machines on a single server.

Figure 2A:
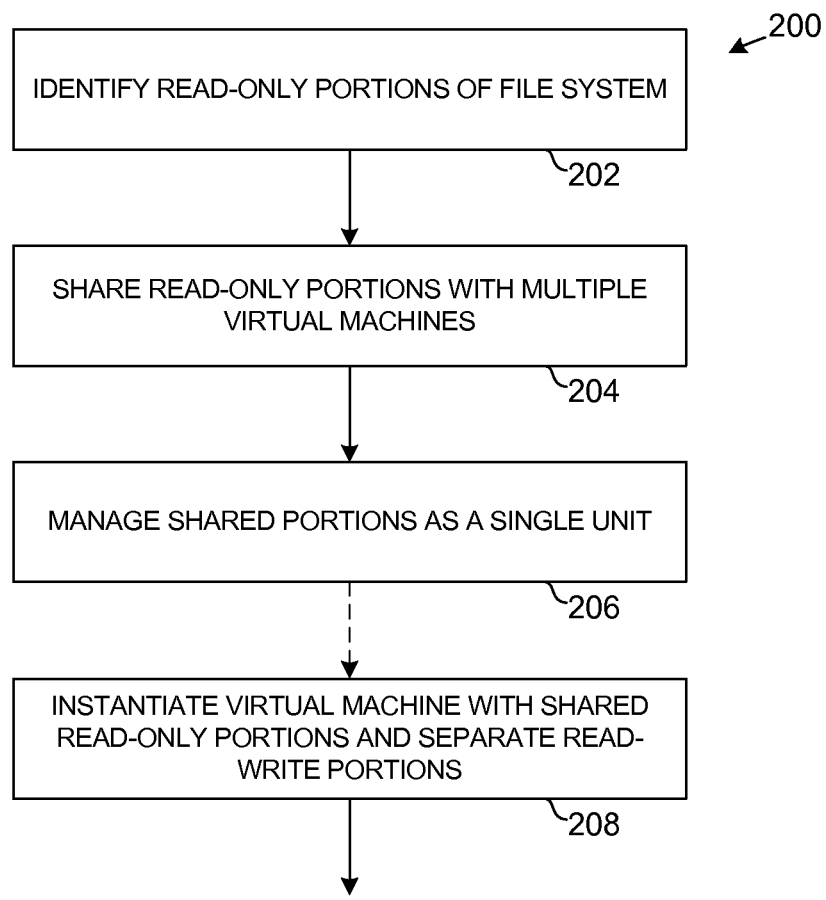
FIGS. 2A through 2D are flow charts illustrating one or more embodiments or aspects of a method for managing virtual machines using shared images.

Referring to FIGS. 2A through 2D, multiple flow charts illustrate one or more embodiments or aspects of a method for managing virtual machines using shared images. Referring to FIG. 2A, an embodiment of a method 200 for managing a computing system can comprise identifying 202 read-only portions of a file system and sharing 204 the read-only portions of the file system among multiple virtual machines. The shared read-only portions of the file system are managed 206 as a single unit.

In some implementations, an operating system image can be instantiated 208 in an individual virtual machine with read-only portions that are shared among the virtual machines and with read-write portions that are accessible to the individual virtual machine alone.

The illustrative method can enable workloads to be isolated at the operating system level while attaining reduced management costs by consolidating virtualized system resources including disks and file systems.

Shared read-only file systems can be assigned to selected virtual machines with read-only files distinguished from read-write files and data.

Figure 2B:
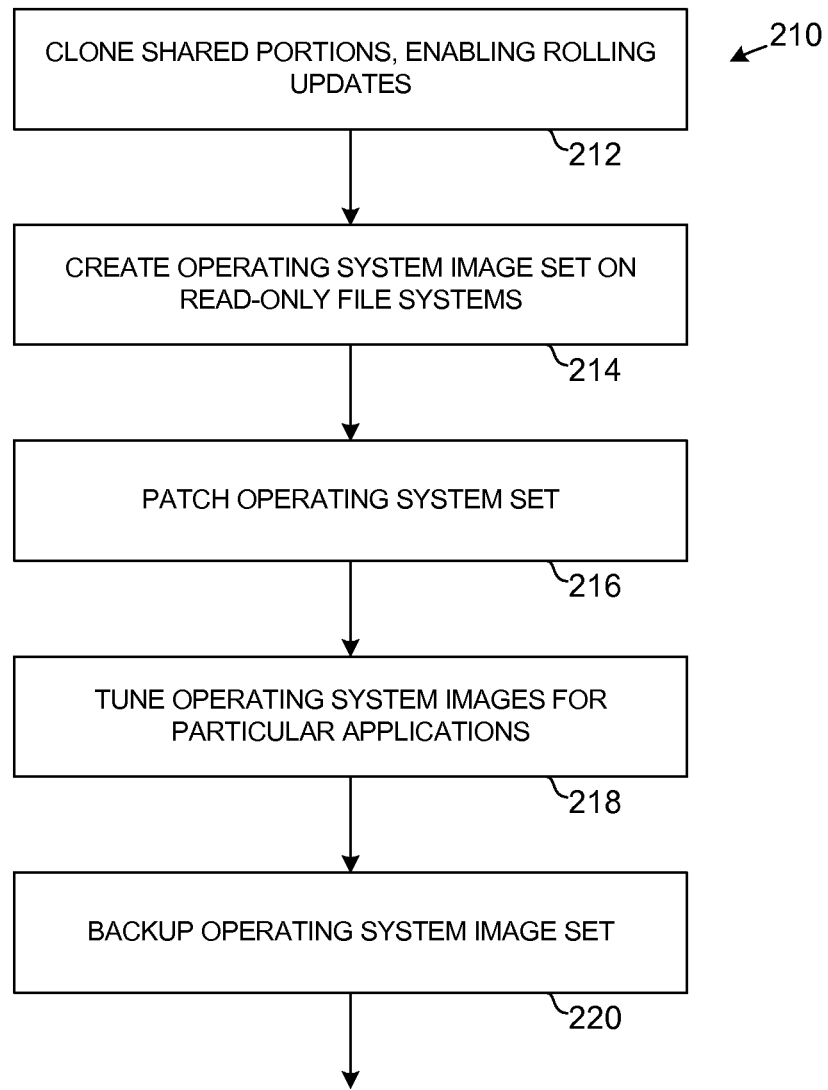

Referring to FIG. 2B, an embodiment of a computing system management method 210 can include cloning 212 the shared portions whereby rolling updates of the shared portions are enabled. Rolling updates can be performed by creating 214 a set of operating system images on read-only file systems and selectively patching 216 the operating system image set for individual applications. One or more selected operating system images can be tuned 218 for particular applications for usage in rolling upgrades and testing. Then the operating system image set can be backed up 220 for virtual machines that use the operating system image set.

Backups can be organized so that data is backed up and restorable within each virtual machine while shared file systems are not duplicated for each virtual machine.

The illustrative technique for managing virtual machines enables backups to be managed in a single backup facility that can backup a platform manager (PMAN) including configuration files, binary files, and the like. The single backup facility can also backup all shared file systems in a single operation, and backup each virtual machine's non-shared file systems. Thus an entire hardware system can be backed up as a unit rather than creating a complex backup environment for each virtual machine separately.

Figure 2C:
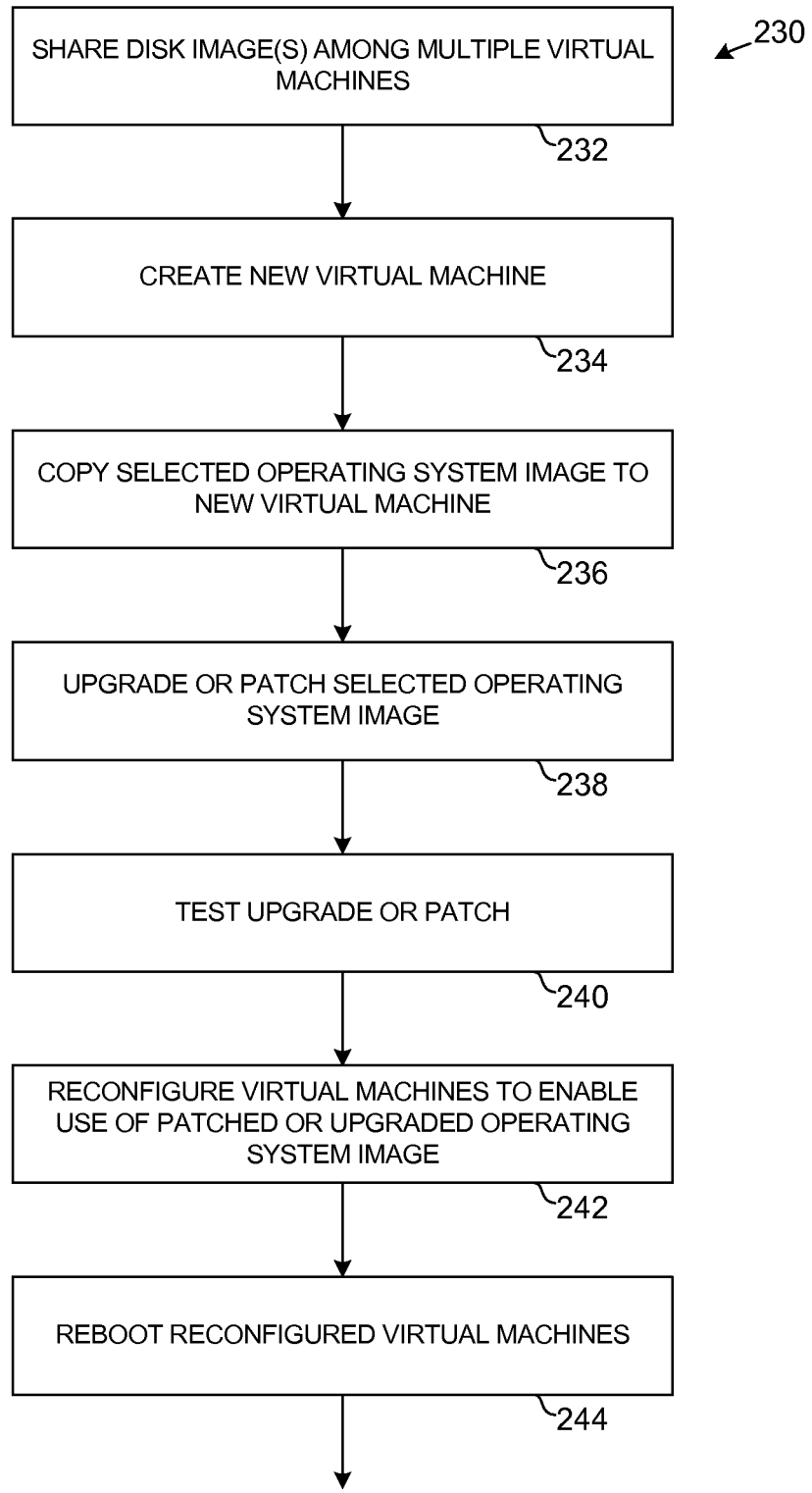

Referring to FIG. 2C, an embodiment of a computing system management method 230 for upgrading or patching an operating system image comprises sharing 232 at least one disk image among multiple virtual machines, creating 234 a new virtual machine for operation among the virtual machines, and copying 236 a selected operating system image to the new virtual machine. The selected operating system image is upgraded or patched 238, then tested 240. The virtual machines can be reconfigured 242 to enable usage of the upgraded or patched operating system image, and the reconfigured virtual machines can be rebooted 244. In some embodiments, the changes to the operating system image can be made without reboot.

Figure 2D:
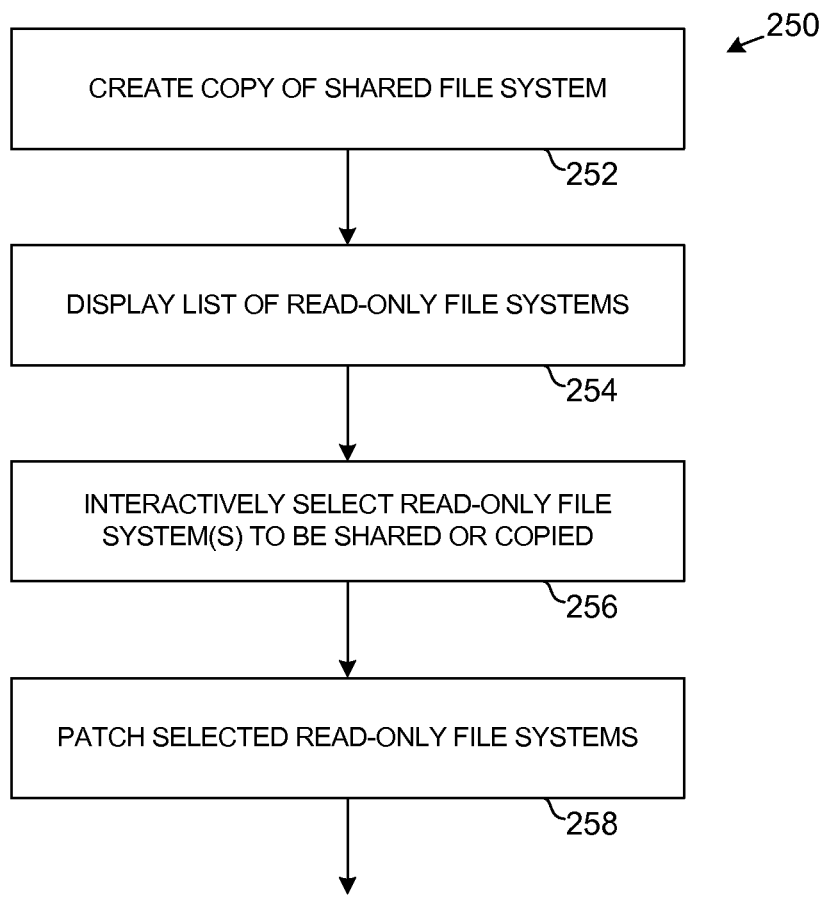

Referring to FIG. 2D, a flow chart illustrates another embodiment of a method 250 for patching a file system. A copy of at least one shared file system is created 252 and a list of read-only file systems are displayed 254 as part of a copy. A user can interactively select 256 which of the list of read-only file systems are to be shared or copied and enable patching 258 of the read-only file systems that are selected for sharing or copy.

The illustrative computing system 100 and associated operating methods enable operating system level isolation of workloads while still attaining many of the reduced management costs that result from consolidating applications on a single operating system image.

The illustrative computing system 100 and operating methods have many benefits, enabling a system running many virtual machines to be managed as a single system. Patches can be applied to many virtual machines with one installation. The entire system can be backed up as a single entity. Rolling upgrades can be performed easily and quickly with very little downtime, for example downtime reduced to the duration of a reboot. In some configurations, the rolling upgrades can be made without reboot.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method comprising:
    instantiating an operating-system image and a first application image in a first virtual machine so that said first virtual machine accesses said operating-system image, said first application image, and a first disk image;
    identifying, by a manger,
        the operating system image as a file with read-only portions to be shared and managed as a single unit, and
        the first application image and the first disk image as files that are to be copied;
    copying, based on the identifying, said first application image to yield a second application image, said first virtual machine to yield a second virtual machine, and said first disk image to yield a second disk image;
    identifying, by the manager, the second application image as a read-write file that is to be accessible to the second virtual machine but not by the first virtual machine;
    updating said second application image; and
    instantiating said operating-system image and the updated second application image in said second virtual machine so that said second virtual machine accesses said operating-system image, said updated second application image, and said second disk image.

2. A method as recited in claim 1 further comprising reconfiguring said first virtual machine to use said second application image.

3. A method as recited in claim 2 further comprising removing or archiving said first disk image.

4. A method as recited in claim 1 wherein said copying includes displaying a list of read-only file systems to be shared or copied.

5. A method as recited in claim 4 wherein said copying further includes patching the read-only file systems selected for sharing or copying.

6. Non-transitory storage media encoded with code configured, when executed by a processor, to implement the method of claim 1.

7. A system comprising non-transitory media encoded with code configured to, when executed using hardware, implement a method including:
    instantiating an operating-system image and a first application image in a first virtual machine so that said first virtual machine accesses said operating-system image, said first application image, and a first disk image;
    identifying, by a manger,
        the operating system image as a file with read-only portions to be shared and managed as a single unit, and
        the first application image and the first disk image as files that are to be copied;
    copying, based on the identifying, said first application image to yield a second application image, said first virtual machine to yield a second virtual machine, and said first disk image to yield a second disk image;
    identifying, by the manager, the second application image as a read-write file that is to be accessible to the second virtual machine but not by the first virtual machine;
    updating said second application image; and
    instantiating said operating-system image and the updated second application image in said second virtual machine so that said second virtual machine accesses said operating-system image, said updated second application image, and said second disk image.

8. A system as recited in claim 7 further comprising reconfiguring said first virtual machine to use said second application image.

9. A system as recited in claim 8 further comprising removing or archiving said first disk image.

10. A method as recited in claim 7 wherein said copying includes displaying a list of read-only file systems to be shared or copied.

11. A method as recited in claim 10 wherein said copying further includes patching the read-only file systems selected for sharing or copying.

12. A system as recited in claim 7 further comprising said hardware.

* * * * *

UNITED STATES PATENT AND TRADEMARK OFFICE
CERTIFICATE OF CORRECTION

| | | |
|---|---|---|
| PATENT NO. | : 8,966,474 B2 | Page 1 of 1 |
| APPLICATION NO. | : 11/742536 | |
| DATED | : February 24, 2015 | |
| INVENTOR(S) | : Dan Herington | |

It is certified that error appears in the above-identified patent and that said Letters Patent is hereby corrected as shown below:

Title Page (74), Attorney, in column 2, line 1, delete "Koester Bertani LLP" and insert -- Koestner Bertani LLP --, therefor.

In the Claims

In column 7, line 56, in Claim 1, delete "manger" and insert -- manager --, therefor.

In column 8, line 33, in Claim 7, delete "manger" and insert -- manager --, therefor.

Signed and Sealed this
Sixteenth Day of June, 2015

Michelle K. Lee
*Director of the United States Patent and Trademark Office*